US012459684B2

(12) United States Patent
Drocco

(10) Patent No.: US 12,459,684 B2
(45) Date of Patent: Nov. 4, 2025

(54) HIGH-SPEED AUTOMATIC LINE FOR PRODUCING PAINTS

(71) Applicant: DROMONT S.p.A., Grinzane Cavour (IT)

(72) Inventor: Luca Drocco, Alba (IT)

(73) Assignee: DROMONT S.p.A., Grinzane Cavour (IT)

( * ) Notice: Subject to any disclaimer, the term of this patent is extended or adjusted under 35 U.S.C. 154(b) by 13 days.

(21) Appl. No.: 18/398,350

(22) Filed: Dec. 28, 2023

(65) Prior Publication Data

US 2024/0228084 A1 Jul. 11, 2024

(30) Foreign Application Priority Data

Jan. 5, 2023 (IT) ........................ 102023000000099

(51) Int. Cl.

| | |
|---|---|
| ***B01F 101/30*** | (2022.01) |
| ***B01F 29/20*** | (2022.01) |
| ***B01F 33/85*** | (2022.01) |
| ***B01F 35/71*** | (2022.01) |
| ***B65B 3/12*** | (2006.01) |
| ***B65B 3/30*** | (2006.01) |
| ***B65B 7/28*** | (2006.01) |
| ***B65B 43/54*** | (2006.01) |

(52) U.S. Cl.

CPC ................ *B65B 3/30* (2013.01); *B01F 29/20* (2022.01); *B01F 33/85* (2022.01); *B01F 35/715* (2022.01); *B65B 3/12* (2013.01); *B65B 7/2842* (2013.01); *B65B 43/54* (2013.01); *B01F 2101/30* (2022.01)

(58) Field of Classification Search

CPC ........... B65B 3/12; B65B 3/30; B65B 7/2842; B65B 37/20; B65B 2220/14; B01F 29/20; B01F 33/84; B01F 33/85; B01F 35/715; B01F 2101/30

USPC ........ 53/111 R, 167, 168, 240, 282; 141/103

See application file for complete search history.

(56) References Cited

U.S. PATENT DOCUMENTS

| | | | | |
|---|---|---|---|---|
| 2,548,106 | A * | 4/1951 | Hancock | B01F 35/3231 366/141 |
| 5,083,591 | A * | 1/1992 | Edwards et al. | B01F 35/2218 235/462.14 |
| 5,203,387 | A | 4/1993 | Howlett et al. | |
| 2005/0189037 | A1* | 9/2005 | Cortes Ferriz | B01F 35/71805 141/102 |
| 2006/0086405 | A1 | 4/2006 | Kaufhold et al. | |

(Continued)

FOREIGN PATENT DOCUMENTS

| | | | | |
|---|---|---|---|---|
| DE | 19954768 | A1 * | 5/2001 | B01F 35/831 |
| EP | 2546647 | A1 | 1/2013 | |
| JP | 2005350096 | A * | 12/2005 | B01F 33/85 |

(Continued)

OTHER PUBLICATIONS

Search Report and Opinion dated Aug. 17, 2023. 7 pages.

*Primary Examiner* — Stephen F. Gerrity

(74) *Attorney, Agent, or Firm* — RMCK Law Group PLC

(57) ABSTRACT

An automatic line for producing paints and the like wherein a dispensing of the bases and colorants is programmed so as to dispense in an order a first base, a dose of colorant and a second base inside a retail container, so that before mixing, the colorant is confined between two bases and there is no risk of part of the colorant adhering to an inner face of the lid without participating in the mixing.

9 Claims, 11 Drawing Sheets

(56) References Cited

U.S. PATENT DOCUMENTS

2023/0071789 A1* 3/2023 Rossetti et al. ......... B01F 33/85

FOREIGN PATENT DOCUMENTS

JP 3742207 B2 * 2/2006 .......... B01F 13/1055
WO 2010015925 A2 2/2010

* cited by examiner

HIGH-SPEED AUTOMATIC LINE FOR PRODUCING PAINTS

CROSS-REFERENCE TO RELATED APPLICATION

This application claims priority to Italian Patent Application No. 102023000000099 filed Jan. 5, 2023. The disclosure of the above application is incorporated herein by reference in its entirety.

FIELD OF THE INVENTION

The present invention relates to the production of paints and the like.

In particular, the invention relates to the preparation of paints by mixing bases and colorants inside retail containers in which the finished paints are put on the market.

More specifically, the invention relates to an automatic high-speed line for producing paints.

STATE OF THE ART

Current systems for preparing paints inside retail containers envisage the preparation of retail containers pre-filled with neutral bases, the dosed introduction of colorants inside the retail containers pre-filled with neutral bases, and the agitation of the retail containers to mix the bases with the colorants and obtain the paints with the final color.

The patent IT102019000021804 by the same applicant discloses a system for coloring paints and the like within retail containers pre-filled with neutral bases, wherein the coloring of the neutral bases involves the dosed introduction of colorants into the retail containers and their agitation to mix the colorants with the neutral bases. The system comprises a treatment line having an inlet for pre-filled retail containers equipped with closing lids, a drilling station for forming holes in the container lids, a dosing station for introducing the colorants into the containers through the lid holes, a closing station for applying closing caps to the lid holes of the containers, and an agitation station for agitating the containers.

However, applying colorants over bases exposes the risk that during mixing by agitation, some of the colorant will adhere to the inside face of the lid and will not be mixed with the base. This leads to an incorrect dosage of the colorant in the respective base and an incorrect color of the final paint.

In addition, variety of different bases or a combination of them can be used in the production of paints. This implies that in a large-scale industrial production, it is necessary to set up a warehouse to store pre-filled containers with a large quantity of possible combinations of starting neutral bases, which would require very large warehouse dimensions.

OBJECT AND SUMMARY OF THE INVENTION

The aim of the present invention is to provide a high-speed automatic line for producing paints that overcomes the problems of the prior art.

According to the present invention, this object is achieved by an automatic line having one or more of the characteristics set forth herein.

The claims form an integral part of the disclosure provided here in relation to the invention.

BRIEF DESCRIPTION OF THE DRAWINGS

The invention will now be described in detail with reference to the attached drawings, given purely by way of non-limiting example, wherein.

It will be appreciated that the accompanying drawings are schematic and that—in certain figures—some components may not be shown to assist in understanding the Figures. It will be appreciated that the various figures may also not be represented on the same scale.

DETAILED DESCRIPTION

Figure 1:
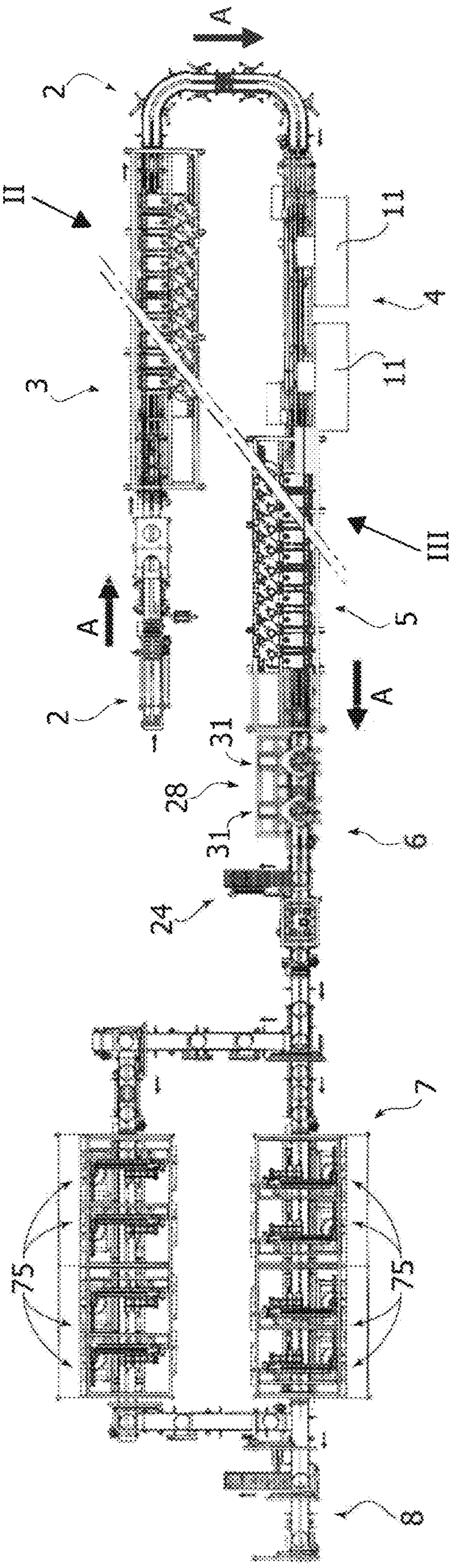
FIG. 1 is a plan view of an automatic line for producing paints and the like according to the present invention.
Figure 2:
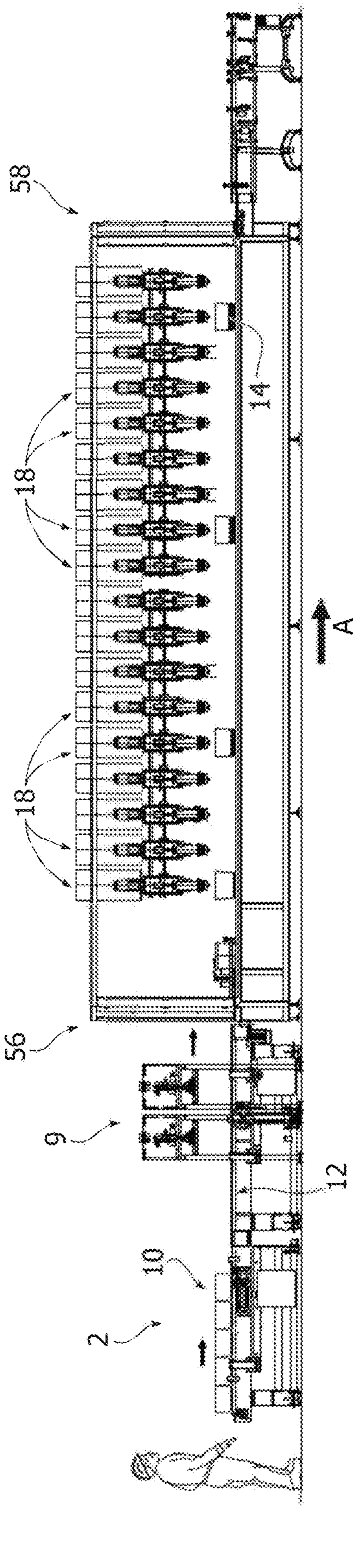
FIG. 2 is an elevation view of a first section of the automatic line indicated by the arrow II in FIG. 1.
Figure 3:
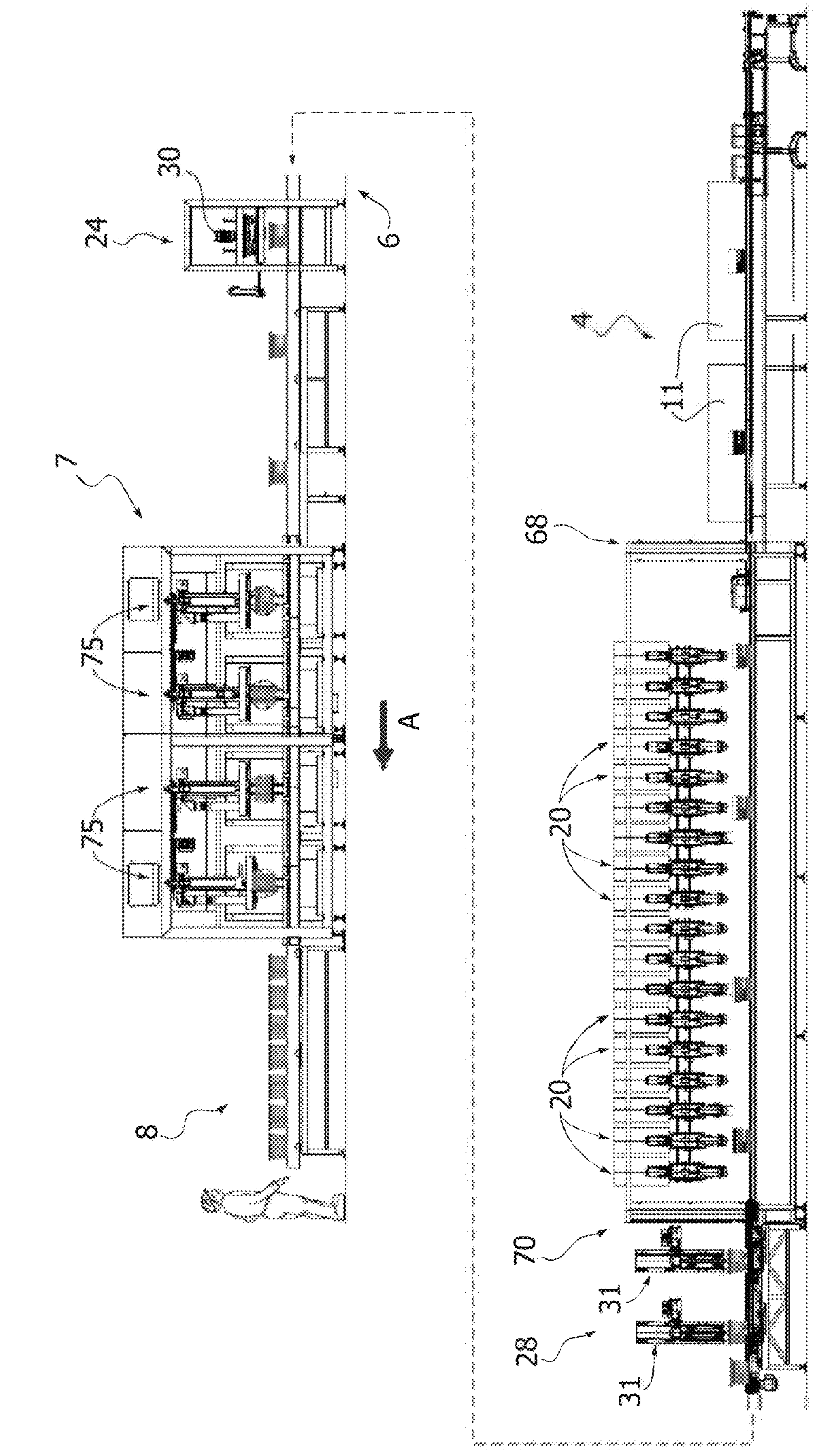
FIG. 3 is an elevation view of a second section of the automatic line indicated by the arrow III in FIG. 1, FIGS. 4-6 are schematic views of a volumetric dosing device in different steps of operation.

With reference to FIGS. 1 to 3, numeral 1 indicates an automatic high-speed line for preparing paints and the like by mixing bases and colorants inside retail containers 10. By "retail containers" it is meant the containers in which the finished paints are placed on the market.

The line 1 comprises a first dosing unit 3, an integrity control unit 9, a coloring unit 4, a second dosing unit 5, a closing unit 6, and a mixing unit 7, arranged in series with each other along a line direction A.

The line 1 comprises a transport system 2 which transports the containers 10 through the integrity control unit 9, the first dosing unit 3, the coloring unit 4, the second dosing unit 5, the closing unit 6, and the mixing unit 7. The transport system 2 may feed the containers 10 along the line direction A continuously or intermittently. The transport system 2 comprises an inlet conveyor 12 on which an array of empty retail containers 10 without lids is arranged. The inlet conveyor 12 feeds the containers 10 in the line direction A inside the first dosing unit 3.

With reference to FIG. 2, the first dosing unit 3 comprises a plurality of volumetric dosing devices 18 spaced apart from each other along the line direction A. In the example illustrated in the figures, the first dosing unit 3 comprises eighteen volumetric dosing devices 18, each of which is configured to deliver a different type of base composition.

With reference to FIGS. 1 and 3, the containers 10 at the outlet of the first dosing unit 3 are fed to the coloring unit 4. In the example illustrated in the figures, the coloring unit 4 comprises two dosing machines 11, each of which is configured to dispense dosed quantities of colorants.

With reference to FIG. 3, the containers 10 at the outlet of the coloring unit 4 are fed to the second dosing unit 5. The second dosing unit 5 may be structurally identical to the first dosing unit 3. The second dosing unit 5 also comprises a plurality of volumetric dosing devices 20, each of which is configured to dispense a different type of base composition. Each of the volumetric dosing devices 20 of the second dosing unit 5 may dispense the same type of base composition as a homologous volumetric dosing device 18 of the first dosing unit 3.

The containers 10 coming from the second dosing unit 5 are then fed to the closing unit 6 in which the containers 10 are closed using respective lids.

Finally, the closed containers 10 are then fed into a mixing unit 7 configured to mix the contents of the containers by agitation.

Figure 4:
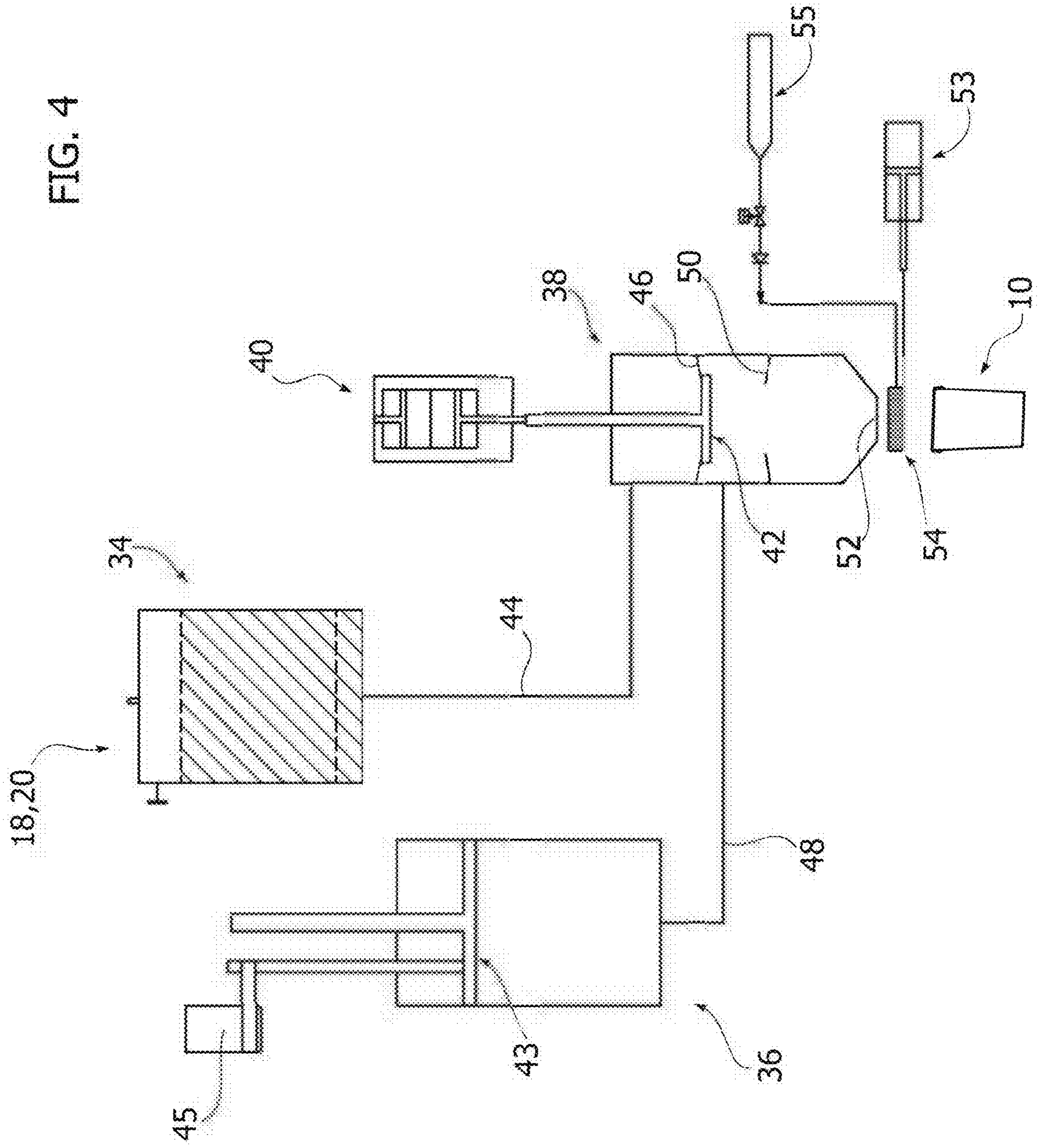
Figure 5:
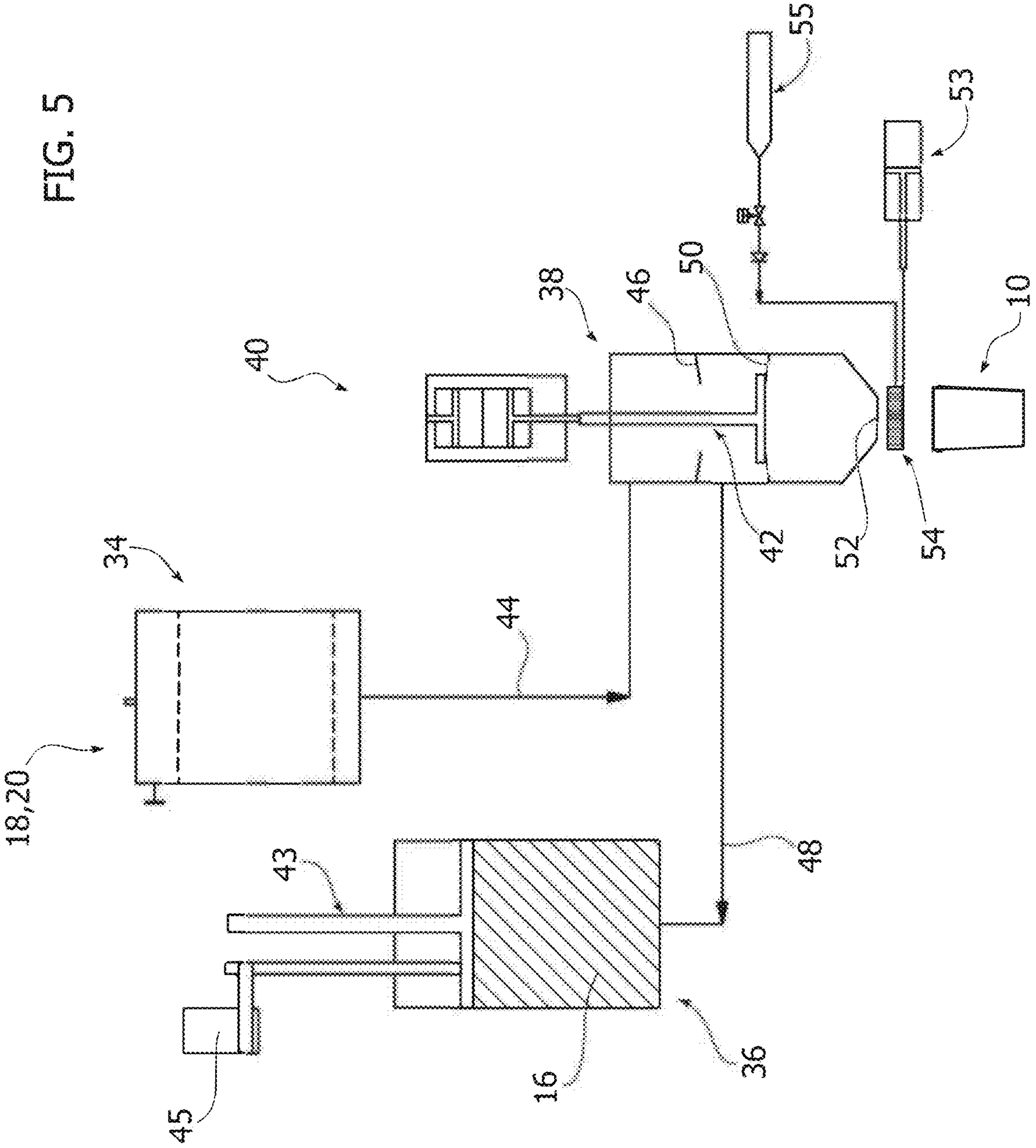
Figure 6:
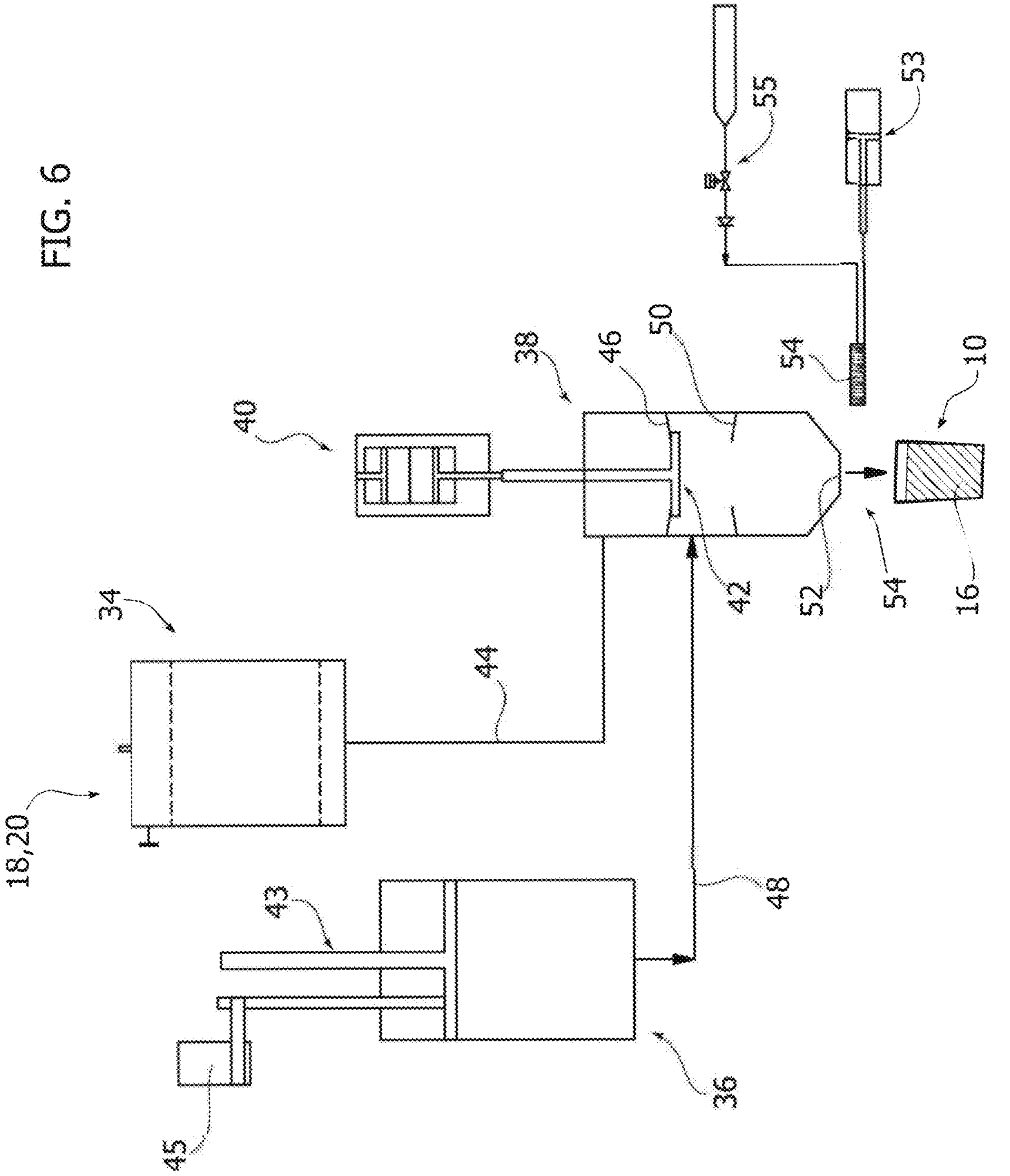

With reference to FIGS. 4 to 6, each of the volumetric dosing devices 18, 20 of the first and second dosing units 3, 5 comprises an accumulation tank 34, a dosing tank 36, and a dispensing cylinder 38. The accumulation tank 34 is arranged at a higher height than the dosing tank 36 and the dosing tank 36 is arranged at a higher height than the dispensing cylinder 38.

The dispensing cylinder 38 has a lower outlet opening 52. The dispensing cylinder 38 comprises a piston 42 actuated by an actuator 40 and movable between a raised position and a lowered position and cooperating with an upper closing surface 46 and a lower closing surface 50.

The dosing tank 36 comprises a dosing volume adjustment device, including a piston 43 actuated by an actuator 45.

Each volumetric dosing device 18, 20 comprises a first hydraulic line 44, which connects the accumulation tank 34 to the dispensing cylinder 38, and a second hydraulic line 48 which connects the dispensing cylinder 38 to the dosing tank 38.

Each volumetric dosing device 18, 20 may include a humidifier device 54 positioned at the lower outlet opening 52 of the dispensing cylinder 38 and comprising an actuator and a water supply unit.

When the piston 42 is in the raised position, as shown in FIG. 4, the upper closing surface 46 is closed by the head of the piston 42.

The actuator 45 regulates the position of the piston 43 so that the volume comprised in the dosing tank 36 is equal to that of the base composition to be dispensed for the single volumetric dispensing device 18, 20.

By activating the actuator 40 to move the piston 42 towards its lowered position, as shown in FIG. 5, the upper closing surface 46 is opened and the lower closing surface 50 is closed. In this way, the accumulation tank 34 and the dosing tank 36 are put into fluid communication. In this step, the base composition is poured from the accumulation tank 34 to the dosing tank 36 by passing the base composition through the first hydraulic line 44, the dispensing cylinder 38 and the second hydraulic line 48. Pouring of the base composition is possible by exploiting the principle of communicating vessels, thanks to the fact that the accumulation tank 34 is arranged at a higher height than the dosing tank 36.

Once the base composition has been poured into the dosing tank 36, the actuator 40 moves the piston 42 towards its raised position, opening the lower closing surface 50 and closing the upper closing surface 46, as shown in FIG. 6. In this way, the fluid communication between the accumulation tank 34 and the dosing tank 36 is interrupted, and the dosing tank 36 and the lower part of the dispensing cylinder 38 are put into fluid communication. In this step, the base composition contained in the dosing tank 36 is poured into the dispensing cylinder 38 and is then dispensed inside the containers 10 through the lower outlet opening 52 of the dispensing cylinder 38. Pouring of the base composition is possible by exploiting the principle of communicating vessels, thanks to the fact that the dosing tank 36 is arranged at a higher height than the dispensing cylinder 38.

At the end of the dispensing of the base composition inside the containers 10, it is possible to activate the actuator 53 to move the humidifier device 54, humidified by the water supply unit 55, so as to keep the lower outlet opening 52 of the dispensing cylinder 38 humid between one dispensing and the next, and to prevent any residues of the base composition 16 from drying out at the dispensing point.

With reference to FIGS. 7 to 14, the operation of the automatic line 1 is as follows.

Figure 7:
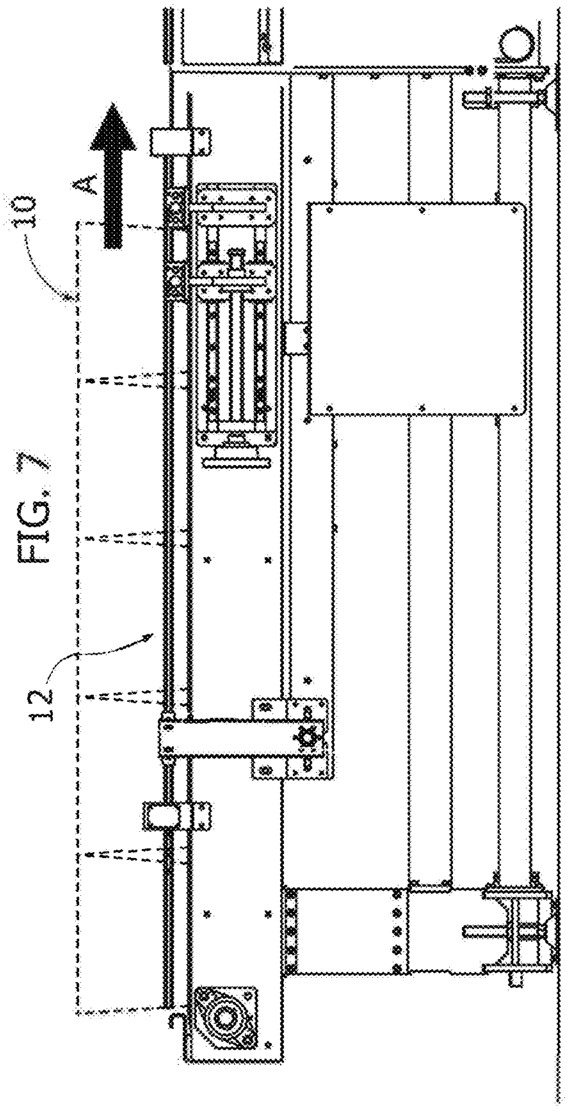
FIGS. 7-14 are schematic elevation views illustrating the operation of the line according to the invention.
Figure 8:
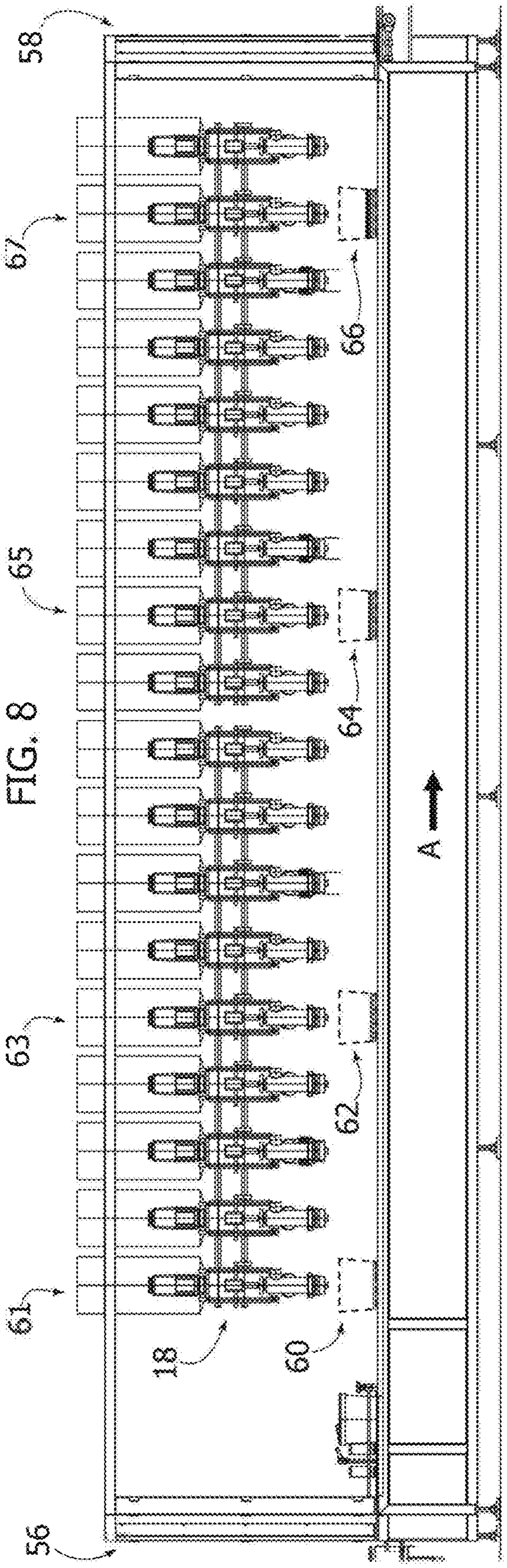

With reference to FIG. 7, an array of empty containers 10 without lids is arranged on the inlet conveyor 12. The inlet conveyor 12 is configured to feed the containers 10 to the first dosing unit 3. Before entering the first dosing unit 3, the retail containers 10 are inspected in the integrity control unit 9, which is configured to verify the structural integrity of the retail containers 10 (for example, that there are no holes or cracks on the surface of the container). In the event that the integrity control unit 9 deems the retail containers 9 unusable, they still continue in the line direction A along the automatic line, however neither base composition 16 nor any dose of colorant will be dispensed. With reference to FIG. 8, the first dosing unit 3 receives the empty containers 10 without lids in an inlet station 56. As already indicated previously, the first dosing unit 3 comprises a plurality of volumetric dosing devices 18 arranged sequentially along the line direction A. A container 10 which is introduced inside the first dosing unit 3 through the inlet station 56 is transported along the line direction A and is stopped at each of the dosing devices 18 which dispense the respective base composition 16 necessary to form a first base 14 with a required composition. For example, in FIG. 8 different positions 60, 62, 64, 66 of the container 10 are represented after it has received a base composition 16 from the respective volumetric dosing devices 18 at the stations 61, 63, 65, 67. Once all the base compositions 16 necessary for forming the first base 14 have been received, the container 10 is taken to an outlet station 58 of the dosing unit 3.

Figure 9:
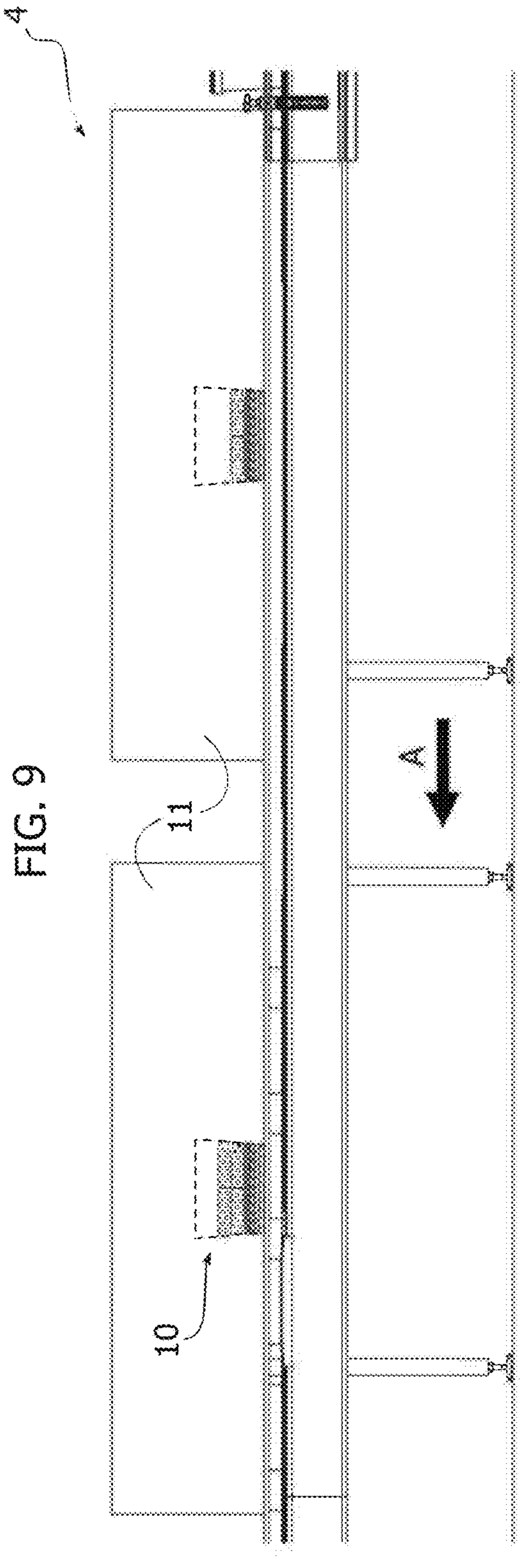

With reference to FIG. 9, the containers 10 without lids coming from the first dosing unit 3 and containing the first base 14 are fed to the coloring unit 4. The coloring unit 4 may comprise two or more dosing machines 11, each of which is configured to dispense a required dose of colorant into the containers 10. In this step, the doses of colorant are dispensed above the first base 14, so as to form a layer of colorant (not shown in the figure) above the first base 14 inside the containers 10.

Figure 10:
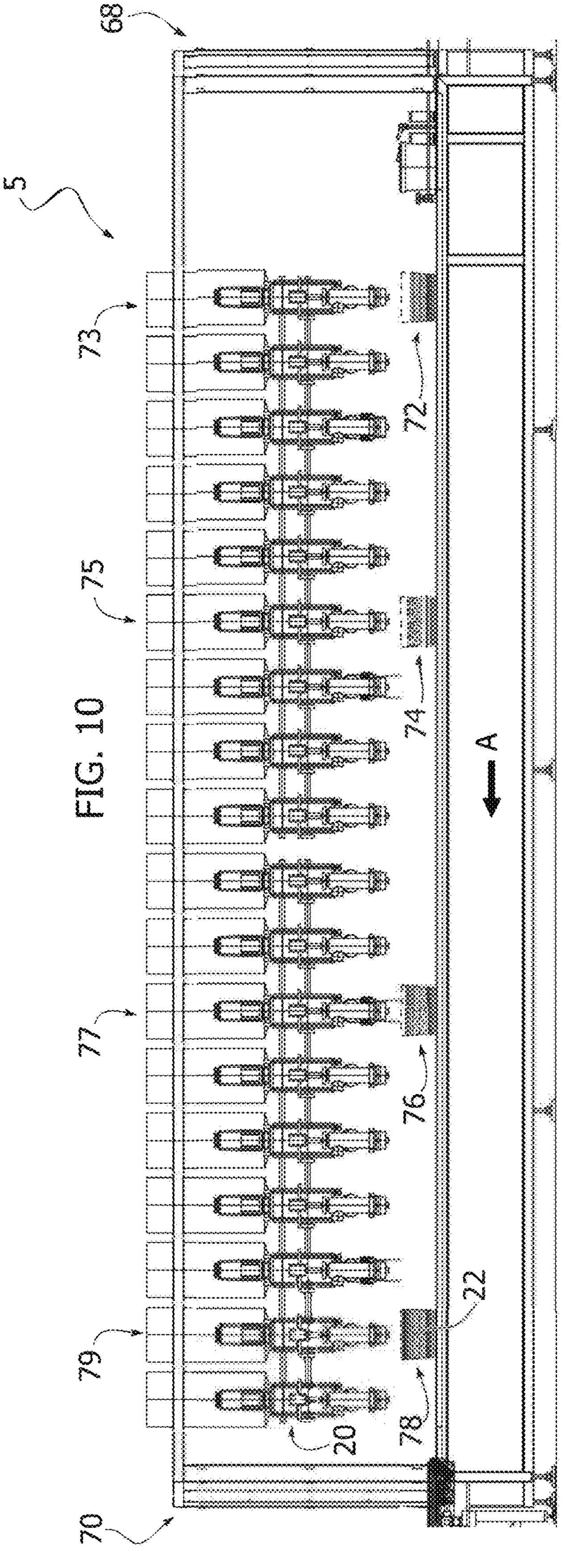

With reference to FIG. 10, the second dosing unit 5 receives the containers 10 containing the first base 14 and the dose of colorant coming from the coloring unit 4, at an inlet station 68. As already indicated previously, the second dosing unit 5, which can be structurally identical to the first dosing unit 3, comprises a plurality of volumetric dosing devices 20 arranged sequentially along the line direction A. A container 10 which is introduced inside the second dosing unit 5 through the inlet station 68, is transported along the line direction A and is stopped at each of the dosing devices 20 which dispense the respective base composition 16 necessary to form a second base 22 with a required composition. For example, in FIG. 10 different positions 72, 74, 76, 78 of the container 10 are represented after it has received a base composition 16 from the respective volumetric dosing devices 20 at the stations 73, 75, 77, 79. Once all the base compositions 16 necessary for forming the second base 22 have been received, the container 10 is taken to the outlet station 70 of the second dosing unit 5.

The second base 22 is formed inside the container 10 above the first base 14 and the doses of colorant previously deposited in the container 10.

In possible embodiments it is possible to use a continuously moving transport system 2 wherein the time and method of dispensing the individual doses 16 from the dosing devices 18, 20 are programmed to dispense the base composition 16 inside the container 10 when this translates close to the individual volumetric dosing devices 18, 20.

In other possible embodiments it is possible to use a transport system 2 in continuous motion and move the dosing devices 18, 20 of the dosing units 3, 5 so as to dispense the individual base compositions 16 inside the container 10, following it into its path along the line direction A.

Figure 12:
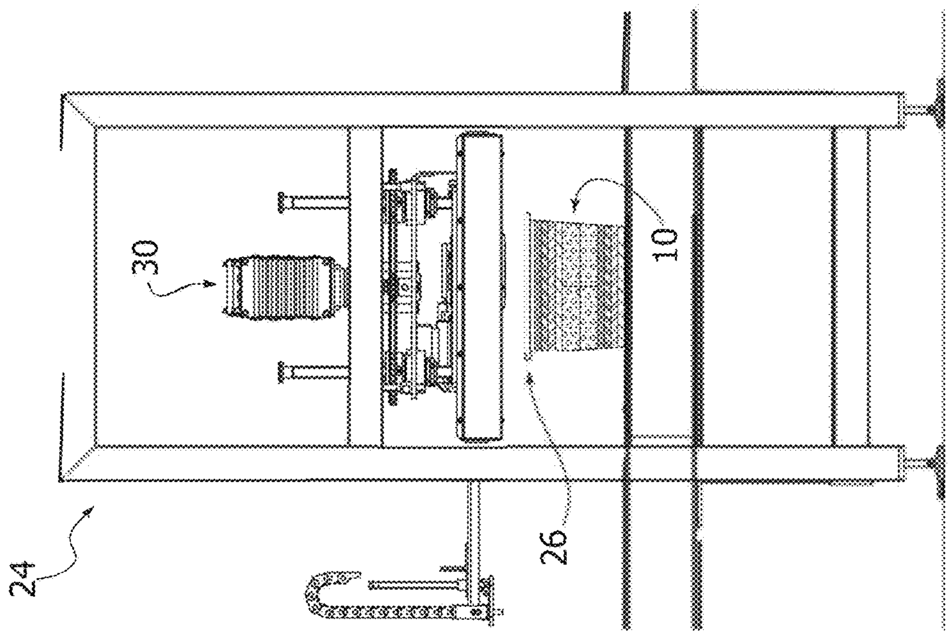
Figure 11:
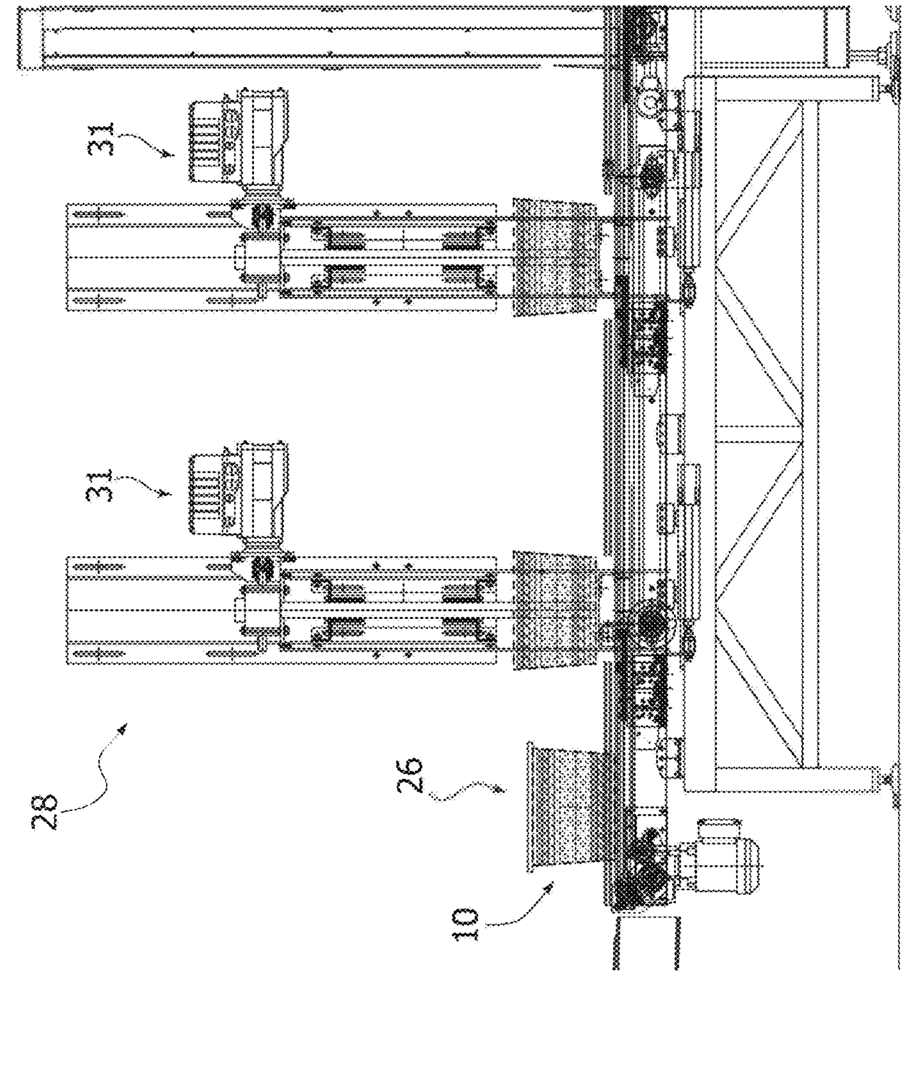

With reference to FIGS. 11 and 12, the containers 10 containing a stratification of the first base 14, the dose of colorant, and the second base 22, coming from the second dosing unit 5 are then fed to a closing unit 6. This closing unit 6 may comprise a lid application device 28 configured to apply lids 26 on top of respective containers 10, and a pressure device 24 including at least one pressure element 30, which presses on the lids 26 to secure them with interference in their respective containers 10. The lid applying device 28 may comprise multiple lid applying stations 31.

The pressure device 24 is also configured to reject from the automatic line 1 all the retail containers 10 that have been deemed unusable by the integrity control unit 9.

Figure 13:
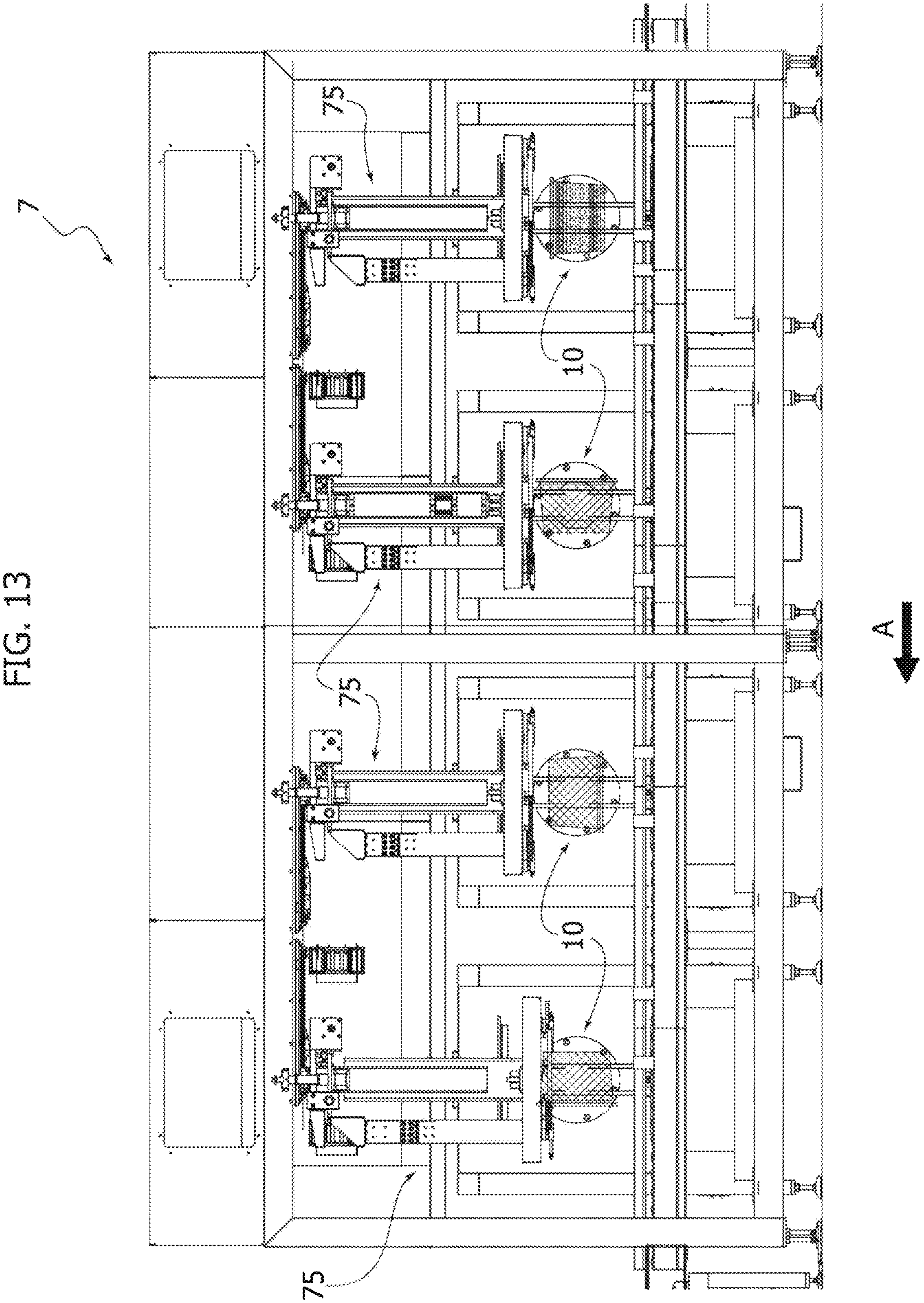

With reference to FIG. 13, the closed containers 10 are fed to the mixing unit 7. The mixing unit 7 may comprise two or more agitating machines 75 configured to mix in a single composition 32 the distinct and stratified components of the first base 14, the dose of colorant, and the second base 22 contained inside the closed containers 10. Mixing is carried out by agitating the closed containers 10 and results in a finished and homogeneous paint.

Figure 14:
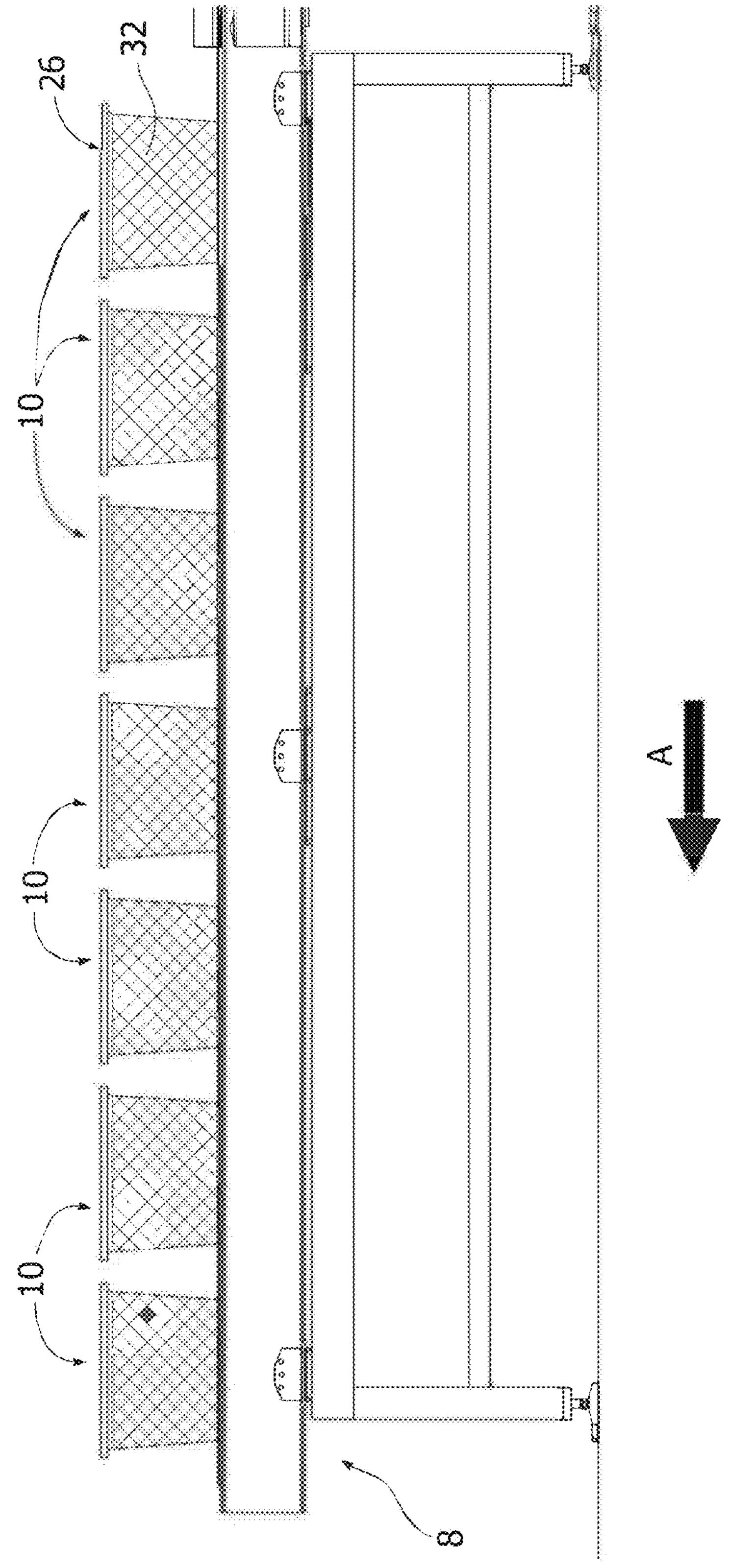

With reference to FIG. 14, the containers 10 coming from the mixing unit 7 are finally taken to the end of the automatic line 1 in an outlet area 8, from which the finished products can be sent to units for labeling, palletizing, etc.

Of course, the details of construction and the embodiments can be widely varied with respect to those described and illustrated, without thereby departing from the scope of the present invention as defined by the claims that follow.

The invention claimed is:

1. An automatic line for producing paints, comprising:

a first dosing unit configured to form in each of a plurality of empty retail containers a first base including at least one first base dose;

at least one coloring unit configured to dispense at least one dose of colorant into the retail containers coming from said first dosing unit via a transport system and containing said first base;

a second dosing unit configured to form a second base including at least one second base dose in the retail containers coming from said at least one coloring unit via the transport system and containing said first base and said at least one dose of colorant;

at least one closing unit configured to apply closing lids to respective retail containers to form closed retail containers;

at least one mixing unit configured to agitate said closed retail containers and to mix said first and second bases and said at least one dose of colorant; and each of the first and second dosing units including a plurality of volumetric dosing devices, each volumetric dosing device including:

an accumulation tank;

a dosing tank, wherein the accumulation tank is positioned above the dosing tank; and a dispensing cylinder in separate fluid communications with the accumulation tank and the dosing tank, the dispensing cylinder having an outlet for dispensing dosages and being positioned below the dosing tank and including a dispensing piston selectively actuatable to i) place the accumulation tank and dosing tank in fluid communication with each other, and ii) place the dosing tank in fluid communication with the outlet of the dispensing cylinder for dispensing one of the at least first base dose and the at least second base dose into the retail containers.

2. The automatic line of claim 1, wherein the transport system is configured to move said retail containers along a line direction, along a path which extends from said first dosing unit to said at least one mixing unit through said at least one coloring unit, and said second dosing unit.

3. The automatic line of claim 2, wherein the plurality of volumetric dosing devices of each of said first and second dosing units are spaced apart from each other along said line direction, and configured to dispense respective first and second base doses into said retail containers.

4. The automatic line of claim 3, wherein said plurality of volumetric dosing devices in each of said first and second dosing units are configured to sequentially dispense respective first and second base doses in each of said retail containers, so as to form in each retail container an overall base including a plurality of different base doses.

5. The automatic line of claim 1, wherein said at least one closing unit comprises a lid applying device configured to apply lids on respective retail containers and a pressing device configured to fix said lids to respective retail containers by force.

6. The automatic line of claim 1, comprising an inlet conveyor configured to advance an array of the plurality of empty retail containers towards said first dosing unit.

7. The automatic line of claim 1, wherein the dispensing piston is selectively actuatable to i) place the accumulation tank and dosing tank in fluid communication with each other and not in fluid communication with the outlet, and ii) block communication of the accumulation tank with the dosing tank and place the dosing tank in fluid communication with the outlet of the dispensing cylinder for dispensing one of the at least first base dose and the at least second base dose into the retail containers.

8. The automatic line of claim 7, wherein the dosing tank includes a dosing volume adjusting device having a dosing piston; and wherein the dosing piston is selectively positionable within the dosing tank to set an internal volume of the dosing tank configured to receive the first or second base to that of the respective first base dose or the second base dose.

9. The automatic line of claim 1, further comprising a humidifier selectively movable between a first position placing the humidifier at the outlet of the dispensing cylinder and a second position spaced apart from the outlet of the dispensing cylinder.

* * * * *